June 16, 1959   M. H. GREENWOOD ET AL   2,890,714
PILOT-OPERATED RELIEF VALVE
Filed March 8, 1955   2 Sheets-Sheet 1
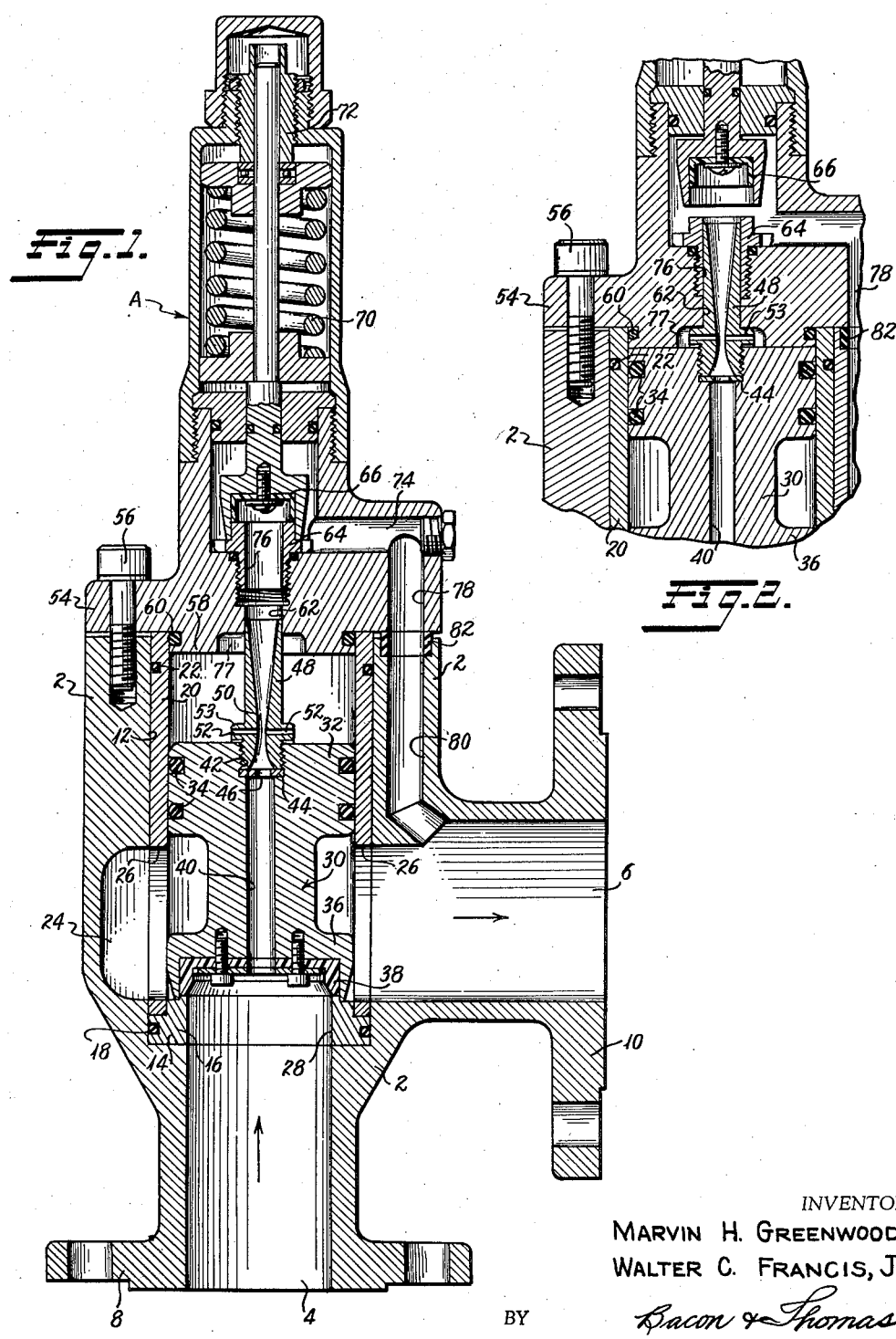
INVENTORS
MARVIN H. GREENWOOD
WALTER C. FRANCIS, JR.
BY Bacon & Thomas
ATTORNEYS June 16, 1959   M. H. GREENWOOD ET AL   2,890,714
PILOT-OPERATED RELIEF VALVE
Filed March 8, 1955   2 Sheets-Sheet 2

INVENTORS
MARVIN H. GREENWOOD
WALTER C. FRANCIS, JR.
BY
*Bacon & Thomas*
ATTORNEYS

United States Patent Office 2,890,714
Patented June 16, 1959

2,890,714

PILOT-OPERATED RELIEF VALVE

Marvin H. Greenwood and Walter C. Francis, Jr., Houston, Tex., assignors to Anderson, Greenwood & Company, Houston, Tex., a corporation of Texas Application March 8, 1955, Serial No. 492,992

11 Claims. (Cl. 137—491)

This invention relates to relief valves, and particularly to valves relying on the pressure in a fluid system to maintain the valve normally closed but responsive to maximum pressures of predetermined values to effect opening of the valve and venting the system to reduce the pressure of the system to the desired level. In the valve of the present invention, the main valve for controlling the fluid system does not open directly in response to the pressure therein but a secondary or pilot valve is provided to initiate opening of the main relief valve.

In general, the main relief valve comprises a piston valve responsive to the pressure in the fluid system to maintain the valve on its seat and thus closed. A pilot valve is supplied with pressure from the fluid system and upon opening at its "set" pressure, vents the fluid holding the main valve closed and produces stream flow through a Venturi restriction or equivalent device. The Venturi restriction is employed to aspirate pressure from the body of fluid holding the main valve closed and thus permits the main valve to open under the influence of pressure in the system. By employing the Venturi feature, highly sensitive control is exercised over the main relief valve and results in the main relief valve opening and closing smoothly and rapidly without chatter or leakage.

It is therefore an object of this invention to provide a new and improved pilot-operated pressure relief valve.

It is a further object of this invention to provide a relief valve employing novel structural features insuring chatter-free operation.

It is a still further object of this invention to provide a pilot-operated pressure-closed relief valve wherein opening of the pilot effects aspiration of valve-closing pressure to facilitate and hasten opening of the main relief valve.

It is another object of this invention to provide a pilot-operated pressure relief valve wherein the main valve will close when the pressure in the system controlled thereby is reduced to a value only slightly below the desired maximum line pressure.

Still another object of the invention is to provide a pilot-operated pressure relief valve wherein the "set" pressure of the pilot may be tested without venting the system controlled by the valve and without increasing the pressure therein to the maximum value.

Still another and further object of the invention is to provide a pilot-operated relief valve wherein the operating mechanisms of the valve may be removed, serviced, replaced or tested without disconnecting the valve body from the line to which it is attached.

Further and additional objects and advantages will become apparent to those skilled in the art as the description proceeds with reference to the accompanying drawings, wherein:

Fig. 1 is an axial sectional view through a valve embodying the present invention;

Fig. 2 is a fragmentary sectional view of a portion of the mechanism of Fig. 1 but showing the parts in different relative positions.

Figure 3:
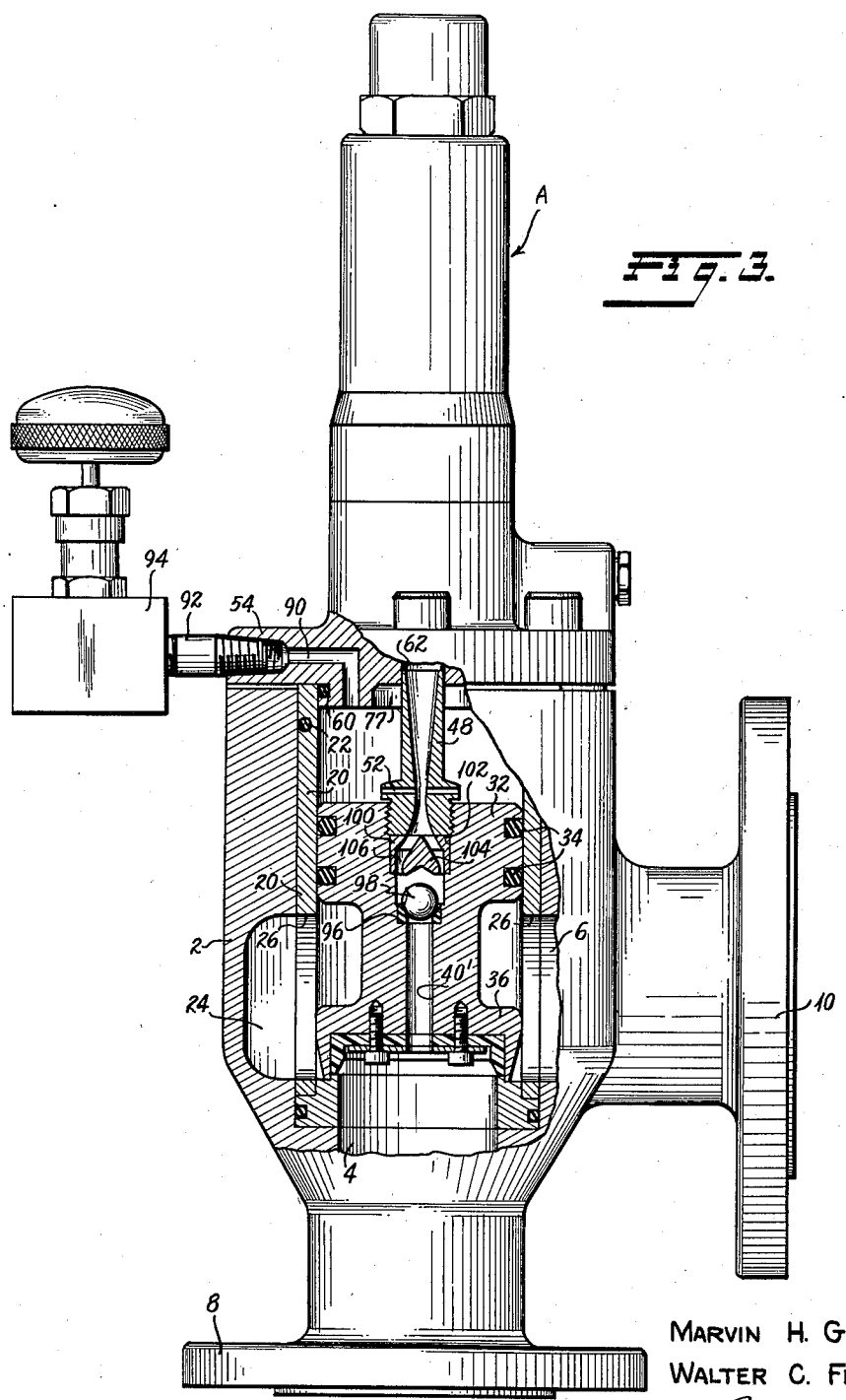
Fig. 3 is a side elevational view, with parts shown in section, of a modification of the valve of Fig. 1.

Referring first to Figs. 1 and 2, the valve of the present invention comprises a main valve body 2, which may be of cast metal, and is provided with an inlet 4 and an outlet 6. The valve is provided with conventional flanges 8 and 10 for connecting the inlet to a pressure line to be controlled by the valve and the outlet to atmosphere or a drain. The inlet 4 will be connected to the pressure line, whereas outlet 6 will be vented to the atmosphere or to a suitable sump or other receiver. The valve body 2 is provided with a cylindrical cavity 12 axially aligned with the inlet 4. The cavity 12 is of substantially greater diameter than the inlet 4 and opens through the upper end of the valve body 2 while terminating at its lower end in an annular shoulder 14 concentric to the inlet 4. A valve seat disc 16 seats on shoulder 14 and is sealed by O-ring 18 in the cylindrical cavity 12. A cylinder sleeve 20, also of greater inner diameter than inlet 4, constitutes a liner for the cavity 12 and abuts, at its lower end, the valve seat disc 16 and extends upwardly slightly beyond the open end of the cylindrical cavity 12. An O-ring 22 seals the cylindrical sleeve 20 in the cavity 12. The sleeve 20 thus defines a cylinder within the valve body.

The outlet 6 communicates with an annular chamber 24 surrounding the lower portion of the sleeve 20 which, in turn, communicates with the interior of the cylindrical sleeve 20 through outlet ports 26 in the sleeve 20 adjacent the lower end of the cylinder. The valve seat disc 16 is provided with an opening 28 constituting an inlet port of less diameter than the inside of the cylinder 20 and at one end thereof.

Throughout this description reference to O-rings is intended as illustrative, it being understood that any other suitable or equivalent sealing means may be used.

A piston valve 30 comprises an upper head or piston portion 32 slidable within the cylinder 20 and sealed therein by means of O-rings 34. At its lower end, the piston valve body 30 is provided with a cup-shaped head 36 and with a cup-shaped non-hard sealing member 38 therein. The features of the cup-shaped head 36, the sealing member 38 and the valve seat 16 constitute the subject matter of copending application Serial No. 455,184, filed September 10, 1954, now Patent No. 2,820,474.

The piston valve body 30 is provided with an axial passageway 40 therethrough, the passageway being in communication with the inlet 4 and extending to a counterbore 42 at the other end of the piston 32. Seated in the bottom of the counterbore 42 is a disc 44 having an aperture 46 therethrough of less diameter than the passageway 40. A tubular extension 48 is threadedly secured in the counterbore 42 and extends axially upwardly from the piston 32 while holding disc 44 in place in counterbore 42. The tubular extension 48 is formed with a Venturi restriction therein having a throat 50. Openings 52 extend through a flange 53 of the tubular extension 48 from the Venturi throat 50 outwardly into communication with the interior of the cylinder 20 above piston 32. The external surface of the tubular extension 48 above flange 53 is of smooth cylindrical shape.

A cap member 54 is secured to the upper open end of the valve body 2, by cap screws 56, and is provided with a central boss 58 extending into the cylinder 20 and sealed thereto by O-ring 60. The cap member 54 bears against the upper end of the projecting portion of cylinder 20 to firmly clamp the cylinder against valve seat disc 16 and to hold the parts in the described assembled relationship. The cap member 54 constitutes a portion of the housing for a pressure relief pilot valve, generally indicated at A. This pressure relief valve is disclosed and claimed in the said copending application Serial No. 455,184, now Patent No. 2,820,474.

In general, the pilot valve A comprises a body having an inlet bore 62, a valve seat member 64, a valve member 66 having a stem 68, a spring 70 acting to hold the valve member 66 seated on valve seat member 64, adjusting means 72 for adjusting the compression of the spring 70, and an outlet passageway 74. The housing of the pilot valve A is, in this instance, specially constructed for cooperation with the pressure relief valve of the present invention. The inlet bore 62 is of about the same diameter as the outer surface of the tubular extension 48 and is axially aligned therewith so that the tubular extension 48 is snugly and slidably received in bore 62. The valve seat member 64 is provided with a central opening 76 of the same diameter as and in axial alignment with the bore 62. The outlet passageway 74 of the pilot valve A communicates with a further passageway 78 aligned with a passageway 80 in the main valve body 2. The passageway 80 communicates with the outlet 6 of the main valve. Suitable sealing means 82 provide a seal between the ends of passageways 78 and 80.

It will be evident from the structure thus far described that the pressure existing in a fluid system controlled by the present valve is transmitted through the inlet 4 to the lower face of main valve 36 and that pressure would tend to open the main relief valve. However, assuming that the pressure in the system is below the pressure for which pilot valve A is set to open, the passageway 40 conducts pressure fluid from the inlet 4 to the tubular extension 48 and therethrough to the inlet of the pilot valve A. Under those conditions spring 70 holds pilot valve A closed. Pressure is also transmitted through openings 52 from the Venturi to the interior of cylinder 20 above piston 32. Since the effective area of piston 32 is greater than the effective area of the valve 36 exposed to inlet pressure, the main valve will be held in tightly closed position regardless of the pressure at inlet 4. Since pilot valve A is closed, the passageways 40, bores 62 and 76, tubular extension 48, opening 52 and the cylinder 20 are filled with fluid under the same pressure and under static conditions.

Assuming now that the pressure in the system increases to the "blow-off" value for which spring 70 is set, that pressure acting on the pilot valve head 66 opens the pilot valve against the action of spring 70 and vents the passageway 40 and the cylinder 20 to the outlet 6. As soon as the pilot valve is opened, as thus described, pressure at the inlet 4 causes stream flow of fluid through the Venturi 48 at substantial speed. Stream flow through the Venturi throat 50 functions in a well known manner to aspirate pressure fluid from the cylinder 20 through openings 52 and thus rapidly reduce the pressure in the cylinder 20 considerably below the pressure acting on the main valve at inlet 4. Thus, pressure at the inlet 4 may rapidly and decisively open the main pressure relief valve 36 to effect "blow-down" of the fluid system through outlet 6. It will be obvious that the Venturi action, as described, utilizes stream flow to evacuate the cylinder 20 without having to rely on inlet pressure acting on the piston to "pump" fluid from the cylinder through the pilot valve. While a Venturi restriction is shown and described herein, it is to be understood that any other equivalent device for decreasing the static pressure may be employed so long as the total pressure loss is less than the difference between the "pop off" pressure setting and the "reseating" pressure setting of the pilot valve. Clearly, the fluid pressure delivered to the pilot valve A must not differ greatly from the pressure at inlet 4 of the main valve. Reference hereafter, and in the claims, to a Venturi or to a Venturi restriction is intended to include the structure shown in the drawings and any such static pressure reducing equivalents thereof.

Fig. 2 illustrates the position of the parts when the main relief valve is in its full open position. It will be noted that the tubular extension 48 may slide upwardly in bores 62 and 76, with flange 53 nested in recess 77, thus permitting the piston 32 to move to the uppermost end of the cylinder chamber. The fit between extension 48 and bores 62 and 76 is preferably quite accurate so that substantially no pressure fluid can leak from cylinder 20 directly into the bore 62 or vice versa. In this way the entire stream flow must pass through the Venturi throat for the purpose described.

The orifice 46 in disc 44 performs no function whatsoever as long as the pilot valve is closed and fluid in passageway 40 is under static conditions. However, when the pilot valve A opens and there is stream flow through the passageway 40 and Venturi restriction, the restricted orifice 46 produces a small pressure drop between the passageway 40 and the inlet to the tubular extension 48. Thus, the pressure acting to hold pilot valve A open, during blow-down, is actually somewhat less than the pressure existing at inlet 4 and in the pressure system being "blown down." By provision of an accurately proportioned restricting orifice 46, the pilot valve A is permitted to start closing before pressure at the inlet 4 drops excessively below the desired value, and the orifice 46 is so designed that the pilot valve A will reach fully closed position and valve 36 will again seat at a time when pressure at the inlet 4 is a minimum amount below the desired value. This function of the orifice 46 is independent of the Venturi restriction and such an orifice may be provided in a valve of the kind described but with the Venturi omitted and would produce the advantageous results set forth.

It is often desirable to test the "set" value of the pilot valve A while the system is operating under pressure and without raising the pressure in the system to the maximum value. The modification of Fig. 3 permits not only testing the setting of pilot valve A and its freedom to operate, but also permits blowing the system down at will.

According to this modification, the portion of the pilot valve housing which acts as a cap for the main valve is modified to provide a further passageway 90 extending into the cylinder 20. A suitable conduit fitting 92 is mounted in communication with the passageway 90 and serves to connect the passageway 90 with one port of a hand-operated valve 94. The other port of the valve 94 may be vented to atmosphere or may be connected to an external source of high pressure fluid. The passageway 40' through the main valve 36 and piston 32 is modified to include a check valve seat 96 and a ball check valve 98. The ball check valve is so arranged as to permit ready flow from the inlet 4 through the valve and piston into the Venturi 48 and cylinder 20 but to prevent reverse flow of fluid. A disc 100 seats in the bottom of the counterbore 102 in piston 32 and is held in place by the tubular extension 48. The disc 100 provides a stop member 104 to prevent unwanted displacement of the ball 98 and openings 106 through the disc 100 may be of such size as to constitute a restricted orifice corresponding to orifice 46, as described in connection with Fig. 1. In all other respects, the valve of Fig. 3 may be identical to that of Fig. 1.

Assuming that the pressure system being controlled by the valve of Fig. 3 is operating at less than the maximum set value, and that it is desired to test the setting of pilot valve A and/or its freedom to open, an external source of pressure fluid is connected to the other port of hand valve 94 and valve 94 may thereupon be opened to admit high pressure from the external source into the cylinder 20. That high pressure is restrained by ball check valve 98 against flow downwardly through passageway 40 and into the system but is admitted through openings 52 into the Venturi and upwardly through tubular extension 48 to bore 62 to act against the pilot valve. A suitable pressure gauge (not shown) may be connected to indicate the pressure in cylinder 20 and the pressure admitted through valve 94 may be increased until the pilot valve A opens. Thus, it is possible to test and determine the exact pressure value at which the pilot valve opens, or to change that setting, without interrupting use of the pressure system controlled by the main valve and without introducing high pressure fluid into that system.

Obviously, the hand-operated valve 94 may have its other port vented whereby upon opening the valve pressure will be vented from the cylinder 20 and the entire system may be "blown down" independently of operation of the pilot valve A.

While specific embodiments of the invention have been shown and described herein, it is to be understood that many modifications may be resorted to within the scope of the appended claims. For instance, the tubular extension 48 defining the Venturi restriction may be secured to the cap member 54 and extend slidably into passageway 40, if desired.

We claim:

1. A pressure relief valve device comprising, a body having an inlet port and an outlet port, a valve for closing said inlet port, a pressure chamber in said body, a passageway through said valve for conducting pressure fluid from said inlet through said valve to said pressure chamber, first means responsive to pressure in said chamber for holding said valve closed, further means responsive to pressure in said chamber for venting said passageway and chamber to said outlet, and means responsive to flow of fluid through said passageway when said passageway and chamber are vented to aspirate pressure fluid from said chamber and rapidly reduce the pressure therein to permit pressure on said valve, at said inlet, to open said valve and permit fluid flow from said inlet to said outlet.

2. A pressure relief valve device as defined in claim 1 wherein said pressure chamber is a cylinder and wherein said first means comprises a piston in said cylinder of greater effective area than the area of said valve exposed to pressure at said inlet, said piston being rigidly connected to said valve.

3. A pressure relief valve device as defined in claim 1 wherein said passageway includes a generally tubular conduit extending through said chamber, a Venturi restriction in said conduit, and an opening in said conduit from the throat of said Venturi restriction to the interior of said chamber, said further means being responsive to pressure in said conduit to vent the same on the downstream side of said Venturi throat.

4. A pressure relief valve device as defined in claim 3 wherein said further means comprises a pressure-responsive relief valve having an inlet, said conduit extending to said inlet.

5. A pressure relief valve device as defined in claim 3 wherein said tubular conduit is fixed to said valve and extends slidably through a wall of said chamber into a bore leading to said further means.

6. A pressure relief valve device as defined in claim 1 including means in said passageway defining a restricted orifice for reducing fluid pressure on the downstream side thereof during flow of fluid through said passageway from said inlet to said further means.

7. A relief valve device as defined in claim 1 including a check valve in said passageway for preventing fluid flow therethrough toward said inlet, and an opening from said chamber to the exterior of said valve body whereby said chamber may be vented independently of said further means or whereby pressure fluid from an external source may be admitted to said chamber.

8. A pressure relief valve comprising, a valve body having a cylinder therein, an inlet port of less diameter than said cylinder in one end thereof, an outlet port in the side of said cylinder adjacent said one end, a piston slidable in said cylinder and having one end thereof formed as a valve to close said inlet port, an axial passageway through said valve and piston, a tubular extension secured to said piston and extending axially therefrom and snugly slidable in an axial bore at the other end of said cylinder, said bore communicating with the outlet of said valve, valve means for closing said bore or for opening the same to said outlet, said tubular extension providing fluid communication from said passageway to said bore and having a Venturi restriction therein, an opening through the side of said tubular extension from the throat of said Venturi restriction to the interior of said cylinder between said piston and said other end.

9. A pressure relief valve as defined in claim 8 wherein said valve means comprises a pilot relief valve responsive to pressure in said bore.

10. A pressure relief valve as defined in claim 8 wherein said tubular extension is removably secured to said piston in a counterbore therein at the end of said passageway, a disc in said counterbore held therein by said tubular extension, and an opening through said disc of less area than said passageway and defining a flow-restricting orifice between said passageway and said Venturi restriction.

11. A pressure relief valve as defined in claim 10 including a check valve in said passageway for preventing fluid flow therethrough toward said inlet, and an opening from said cylinder to the exterior of said valve body whereby said cylinder may be vented independently of said valve means or whereby pressure fluid from an external source may be admitted to said cylinder.

References Cited in the file of this patent

UNITED STATES PATENTS

| | | |
|---|---|---|
| 314,649 | Campbell | Mar. 31, 1885 |
| 1,209,795 | Anderson | Dec. 26, 1916 |
| 1,646,640 | Daniel | Oct. 25, 1927 |
| 2,351,873 | Parker | June 20, 1944 |
| 2,366,596 | Clifton | Jan. 2, 1945 |
| 2,417,994 | Sheets | Mar. 25, 1947 |
| 2,532,123 | Shafer | Nov. 28, 1950 |
| 2,661,017 | Geiger | Dec. 1, 1953 |